United States Patent
Beintken

(10) Patent No.: US 7,339,412 B2
(45) Date of Patent: Mar. 4, 2008

(54) DIGITAL CLOCK GENERATOR

(75) Inventor: Hartmut Beintken, San Diego, CA (US)

(73) Assignee: Micronas GmbH, Freiburg (DE)

( * ) Notice: Subject to any disclaimer, the term of this patent is extended or adjusted under 35 U.S.C. 154(b) by 0 days.

(21) Appl. No.: 10/276,847

(22) PCT Filed: May 17, 2001

(86) PCT No.: PCT/EP01/05675

§ 371 (c)(1),
(2), (4) Date: Apr. 14, 2003

(87) PCT Pub. No.: WO01/90863

PCT Pub. Date: Nov. 29, 2001

(65) Prior Publication Data

US 2003/0151440 A1 Aug. 14, 2003

(30) Foreign Application Priority Data

May 19, 2000 (DE) .............................. 100 24 783

(51) Int. Cl.
*G06F 1/04* (2006.01)
(52) U.S. Cl. ................... 327/291; 327/293; 327/299; 375/376
(58) Field of Classification Search ............. 327/291, 327/293, 294, 295, 296, 298, 299, 261, 263, 327/264; 348/537, 538; 375/376; 713/500, 713/501, 600
See application file for complete search history.

(56) References Cited

U.S. PATENT DOCUMENTS

| 3,882,403 | A |   | 5/1975  | Gerken ..................... 328/14 |
| 4,933,890 | A |   | 6/1990  | Nuytkens et al. ......... 364/721 |
| 5,170,417 | A | * | 12/1992 | Winter ...................... 377/44 |
| 5,247,469 | A |   | 9/1993  | McCune, Jr. .............. 364/721 |
| 5,638,010 | A |   | 6/1997  | Adams ....................... 327/105 |

FOREIGN PATENT DOCUMENTS

| EP | 0 264 691 | 10/1987 |
| EP | 0 280 254 | 2/1988 |

* cited by examiner

Primary Examiner—Kenneth B. Wells
Assistant Examiner—An T. Luu
(74) Attorney, Agent, or Firm—O'Shea, Getz & Kosakowski, P.C.

(57) ABSTRACT

The invention relates to a clock generator comprised of a system clock input (2) for applying a high-frequency system clock signal, of a digital input (3) for applying a settable digital increment value, of an adder (6) for adding the increment value with the feedback digital cumulative value of the adder, of an output register (13) for outputting the highest-order data bit of the digital cumulative value as an output clock signal of the clock generator (1) over an output clock line, and of a digital phase deviation calculating unit (30) for calculating the phase deviation of the output clock signal according to the remaining low-order data bits of the digital cumulative value and of the digital increment value, whereby the phase deviation is output as a digital phase deviation value to a digital data output (29).

11 Claims, 3 Drawing Sheets

DIGITAL CLOCK GENERATOR

PRIORITY INFORMATION

This patent application claims priority from International patent application PCT/EP2001/05675 filed May 17, 2001 and German patent application DE 100 24 783.0 filed May 19, 2000, which are hereby incorporated by reference.

The invention relates to a digital clock generator for digital application circuits requiring a very precise clock signal.

Clock generators are functional units within digital electronic systems in which clock pulses required for control are generated. Since a multiplicity of different clock signals is needed to control a complex digital system, output clock signals are generated by digital clock generators from a high-frequency system clock signal for the various application circuits within the complex digital system.

Increasingly, analog clock generators are being replaced by fully digital clock generators. In terms of circuit technology, conventional digital clock generators are designed as feedback adders and are designated as DTO clock generators (DTO: digital timing generator). These conventional DTO clock generators are employed in the area of video signal processing to generate pixels in the 100 Hz range, these DTO clock generators being operated using a system clock input signal with a system frequency greater than 600 MHz and thus generating an output signal which exhibits a high phase deviation or jitter. In the area of video signal processing, the maximum phase deviation of the output clock signal generally allowed is up to 3 ns; however, some applications exist which require an even smaller phase deviation for the output clock signal of the clock generator.

For video signal processing, for example, digital CVBS encoders (CVBS=color video blanking signal) require a very precise clock signal with a very small phase deviation. The phase deviation here must be less than 2 ns since this phase deviation is otherwise perceptible by the human eye for homogeneous color planes on the screen surface. For digital CVBS encoders, the digital clock generator should therefore generate an output clock signal, the phase deviation of which is less than 1 ns. It is not possible to obtain such a low phase deviation for the output clock signal by increasing the system clock frequency of the system clock signal received by the digital clock generator since this approach would required system clock frequencies of more than one GHz.

U.S. Pat. No. 4,933,890 discloses a digital clock generator, which provides a phase-compensated clock signal. The digital clock generator has an adder which with each clock pulse of a system clock signal adds up an incremental value supplied from an external source, the most-significant bit of this adder being supplied to a D flip-flop, to the output of which the clock signal is applied. The D flip-flop is clocked to output a phase-compensated clock signal as a function of the low-order bits of the adder, which are processed by a delay circuit.

The goal of the invention is to create a digital clock generator, which, in addition to generating an output clock signal for an application circuit, provides information to this application circuit on the phase deviation contained in the output clock signal.

This goal is achieved according to the invention by a digital clock generator having the characteristic features indicated in claim 1 of the patent.

SUMMARY OF THE INVENTION

The invention creates a digital clock generator, which includes a system clock input to apply a high-frequency system clock signal, a digital data input to apply an adjustable digital incremental value, an adder to add the incremental value to the feedback summed value of the adder, an output register to output the most-significant data bit of the summed value as the output signal and clock signal of the clock generator through an output clock line, and a digital phase deviation calculation unit to calculate the phase deviation of the output clock signal as a function of the remaining low-order data bits of the digital summed value and digital incremental value, wherein the calculated phase deviation is output as a digital phase deviation value to a digital data output.

In a preferred embodiment of the clock generator according to the invention, the digital phase deviation calculation unit has a scaling device connected to the digital data input to scale up the phase deviation value as a function of the incremental value.

The incremental value supplied by the scaling device is preferably temporarily stored in a scaling register of the digital phase deviation calculation unit.

The digital phase deviation calculation unit preferably has a register to temporarily store the low-order data bits of the digital summed value generated by the adder.

The digital phase deviation calculation unit preferably has a multi-bit multiplier which multiplies the temporarily-stored scaled incremental value by temporarily-stored low-order data bits of the summed value to calculate the digital phase deviation value.

In a preferred embodiment, a register is connected following the adder to temporarily store the summed value.

The register is preferably clocked by the high-frequency system clock signal.

In an especially preferably design, the high-frequency system clock signal has a frequency greater than 600 MHz.

¹Translator's note: "the" interpolated.

The output clock line and the digital data output of the digital clock generator are preferably connected to a data processing unit which converts an input data stream applied within an equidistant time pattern, which data stream has the non-equidistant time pattern of the output clock signal applied to the output clock line.

A digital-to-analog converter is preferably provided to convert the output data stream to an analog output signal.

The digital-to-analog converter is preferably clocked by the output clock signal.

The digital clock generator according to the invention is preferably employed to generate a clock signal for a digital CVBS encoder.

In addition, the digital clock generator according to the invention is preferably employed as an oscillator in a digital phase-locked loop.

The following discussion describes a preferred embodiment of the digital clock generator according to the invention with reference to the attached figures in order to explain essential features of the invention.

DETAILED DESCRIPTION OF THE INVENTION

Figure 1:
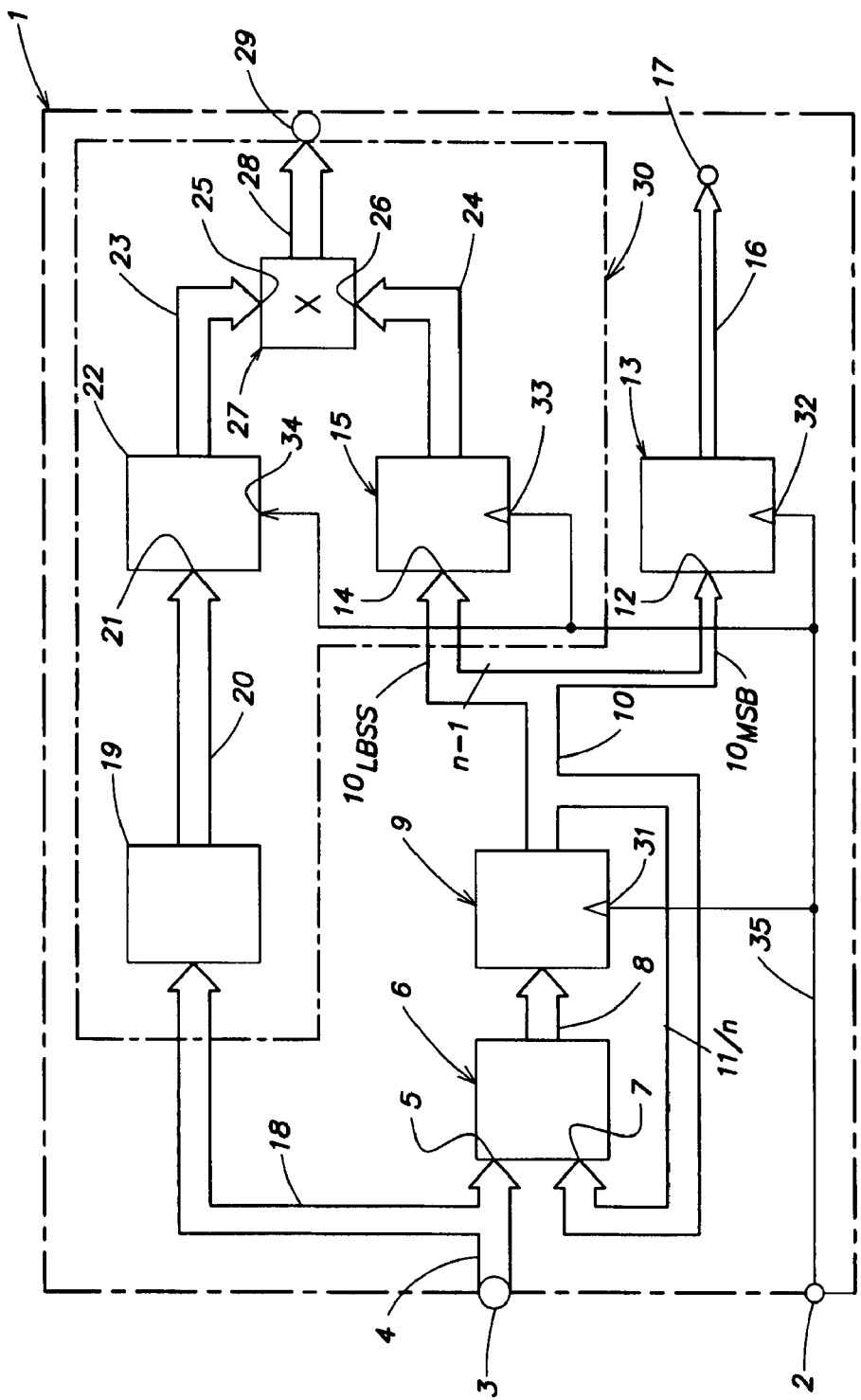
FIG. 1 is a block diagram of the digital clock generator according to the invention.

As FIG. 1 shows, the digital clock generator according to the invention has a system clock input 2 to apply a high-frequency system clock signal, and a digital data input 3 to apply an adjustable digital incremental value. The incremental value applied to digital data input 3 is applied through internal data lines 4 to first data inputs 5 of a digital adder 6. Adder 6 has additional data inputs 7 and output lines 8. Adder 6 adds the digital value applied to data input 5 to the digital value applied to data input 7 and delivers the summed value formed through data lines 8 to a following register 9. The summed value from the addition is temporarily-stored in register 9 and output through output data lines 10. The output data lines 8 of summer 6 and the output data lines 10 of temporary memory 9 each have a data bus width of n bits which represents the bit width of digital clock generator 1. Output lines 10 of temporary memory 9 are returned through feedback lines 11 to the second data input 7 of adder 6. Digital adder 6 adds the incremental value applied to digital input 3 to the temporarily-stored summed value fed back through data lines 10 and feedback lines 11. The n data lines 10 of temporary memory 9 are split, the data line $10_{MSB}$ for the most significant bit MSB being connected to the data input 12 of an output register 13, and the remaining n−1 low-order data bit lines $10_{LSB}$ being applied to data input 14 of a register 15. The function of register 15 is to temporarily store the n−1 low-order data bits of the summed value. Register 15 preferably consists here of multiple flip-flops. Output register 13 temporarily stores the most significant data bit of the summed value supplied through data line $10_{MSB}$ and delivers this, clocked by the high-frequency system clock signal, through an output clock line 16 to an output clock terminal 17 of digital clock generator 1.

[2] Translator's note: inconsistent usage; elsewhere "adder."
[3] Translator's note: inconsistent usage; elsewhere "register."

The incremental value applied to digital data input 3 is fed through internal data lines 18 to a scaling device 19. The function of scaling device 19 is to scale the phase deviation value output by digital clock generator 1 as a function of the incremental value which is applied to digital data input 3. Scaling device 19 is connected on the output side through data lines 20 to data input 21 of an additional register 22 which temporarily stores the scaling value.

Registers 15, 22 are connected through output data lines 23, 24 to inputs 25, 26 of a multi-bit multiplier 27 which multiplies the digital values held in registers 15, 22 and outputs them through output data lines 28 to a digital data output 29 of digital clock generator 1.

Scaling device 19, register 15 for temporarily storing the n−1 low-order bits of the summed value, register 22 for temporarily storing the scaled incremental value, and the multi-bit multiplier 27 together form a phase deviation calculation unit 30 which calculates the phase deviation of the output clock signal of digital clock generator 1, the output clock signal being output through the digital clock output 17. Phase deviation calculation unit 30 calculates the phase deviation of the output clock signal as a function of the n−1 low-order data bits of the summed value formed by adder 6 and of the digital incremental value applied to digital data input 3. The digital incremental value here is adjustable externally.

Registers 9, 13, 15, 22 have system clock inputs 31, 32, 33, 34 which are connected to a common internal system clock line 35 of digital clock generator 1. Internal clock line 35 is connected to system clock input 2 of digital clock generator 1. The high-frequency system clock signal, which is applied to system clock input 2, is preferably generated by a quartz oscillator and a frequency multiplier, and has a system clock frequency of greater than 600 MHz.

The output clock signal of clock generator 1 exhibits a phase deviation since uneven division factors between the system frequency and the output frequency may also be generated based on the incremental value. Within digital clock generator 1, however, an n-bit-wide digital value is applied via internal data lines 10, which value contains more precise information on the phase position of the output signal. By evaluating the digital value, applied to n−1 low-order bit lines 10, which contains information on the phase position of the output clock signal, it is possible to calculate, in addition to each clock-pulse edge of the output clock signal, an associated phase deviation. This calculation is performed by phase deviation calculation unit 30.

Since, within one system clock pulse, the incremental value is added up in adder 6 exactly once, this value as a remainder, that is, as n−1 low-order data bits, corresponds precisely to one system clock period of the digital clock generator. Immediately following a rising clock-pulse edge of the output clock signal, the maximum value which may be present in register 15 is the incremental value decremented by one.

In all cases, where the following applies:

$$\text{incremental value} < 2^{n-1} \qquad (1)$$

the full bit width is utilized only when the remaining low-order data bits of the digital summed value are immediately scaled. To this end, the incremental value is set as the maximum bit width n of digital clock generator 1. Normally, the n−1 low-order data bits temporarily stored in register 15 are, at the instant of the active output clock-pulse edge, a precise measure of the actual phase deviation of the output clock pulse relative to the desired ideal clock signal. However, this remainder of the digital summed value depends, in terms of its quantity, additionally on the applied incremental value. The actual quantity of an equidistant subphase $T_{SUB}$ depends on the applied digital incremental value.

$$T_{SUB} = \frac{T_{clkout}}{\text{incremental value}} \qquad (2)$$

The incremental value may change dynamically, and thus, in order to recreate the fixed temporal relationship, the phase deviation value is converted or scaled as a function of the incremental value by scaling device 19 of phase deviation calculation unit 30.

Scaling by scaling device 19 delivers a scaled incremental value according to the following equation:

$$\text{incremental value}_{scaled} = \frac{2^{n-1}}{\text{incremental value}} \qquad (3)$$

The scaled incremental value is temporarily stored in register 22 and multiplied by the temporarily stored n−1 low-order data bits of the summed value temporarily stored in register 15 so that the calculated phase deviation results for:

$$\text{phase } deviation_{out} = \text{remainder} \frac{2^{n-1}}{\text{incremental value}} \quad (4)$$

where the remainder designates the low-order data bit of the summed value.

Phase deviation calculation unit 30 determines a phase deviation value which, independently of the instantaneous incremental value, resolves the period of the output clock signal $T_{clkout}$ into a fixed number of equidistant subphases $T_{SUB}$.

The calculated phase deviation value indicates the phase deviation with a data resolution according to the following equation:

$$\text{resolution} = \frac{f_{system\ clock}}{2^{n-1}} \quad (5)$$

where $f_{system\ clock}$ is the system clock frequency of the high-frequency system clock signal.

Digital clock generator 1 according to the invention delivers, in addition to the output clock signal supplied from output clock signal[4] 17, a digital phase deviation value at digital data output 29, which value indicates the phase deviation from a virtual ideal clock output signal, that is, the value being the actual jitter quantity. By calculating this digital phase deviation value, it is possible to correct or interpolate the digital values calculated in the following data processing units based on the supplied phase deviation values.

[4]Translator's note: inconsistent usage; elsewhere called "output clock terminal" or "clock line output."

Figure 2:
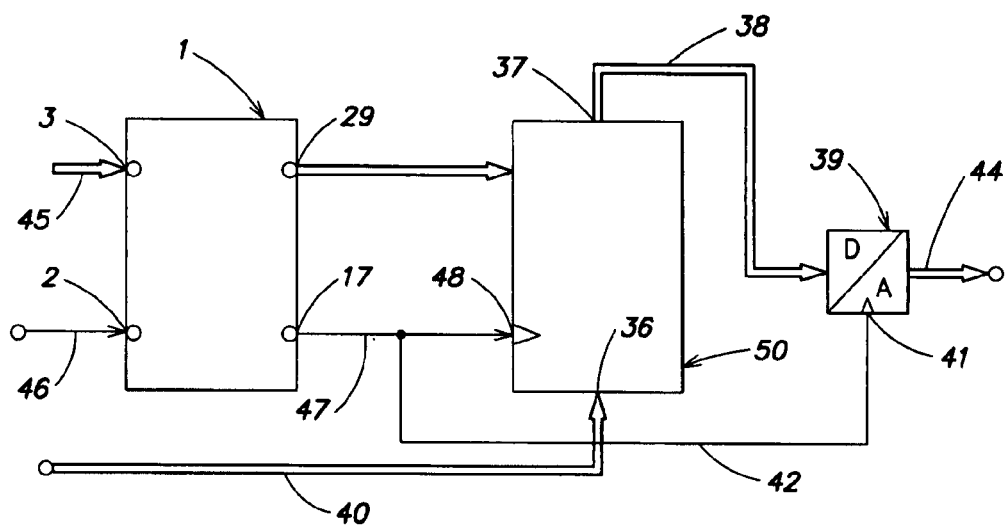
FIG. 2 shows an application circuit which contains the digital clock generator according to the invention shown in FIG. 1.

FIG. 2 shows an application circuit which contains the digital clock generator 1 according to the invention.

At its system clock input 2, digital clock generator 1 receives a high-frequency system clock signal through line 46, the signal having been generated, for example, in a quartz oscillator and a frequency multiplier. An adjustable incremental value is applied to digital data input 3 through data lines 45. At its clock output terminal 17, digital clock generator 1 generates an output clock signal which reaches a clock input 48 of a data processing unit 50 through clock line 47. Data processing unit 50 has a data input 36 to apply a digital input data stream, and a data output 37 to deliver an output data stream, via data lines 38 to a following digital-to-analog converter 39. Data input 36 of data processing unit 50 receives an input data stream through data lines 40 which are converted by data processing unit 50 to the output data stream. The output data stream is converted in digital-to-analog converter 39 to an analog output signal which is delivered through a signal line 44. Digital-to-analog converter 39 also has a clock input 41 which is connected through a clock line 42 to clock signal output 17 of digital clock generator 1.

Data processing unit 35 converts the input data applied in an equidistant time pattern, which data the processing unit receives through lines 40, to an output data stream which has the non-equidistant time pattern of the output clock signal of digital clock generator 1 applied to clock line 33.

Figure 3A:
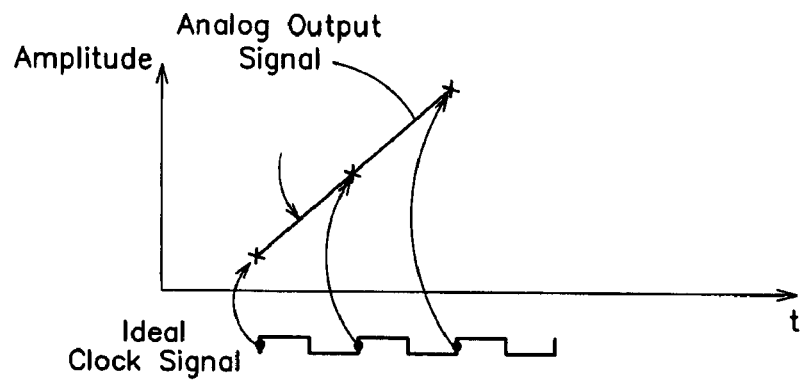
FIG. 3 contains signal sequence charts to explain the functional operation of the application shown in FIG. 2.

FIG. 3a shows a linearly rising edge of an analog output signal for an ideal output clock signal of clock generator 1.

Figure 3B:
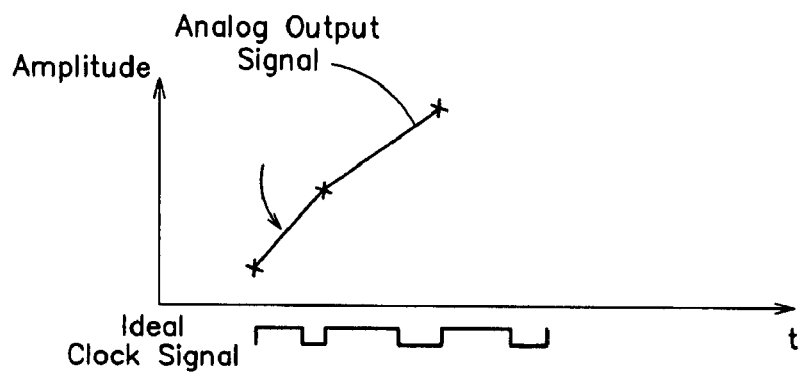

FIG. 3b shows a real case in which a real clock output signal is supplied from digital clock generator 1.

This real clock output signal is provided with a phase jitter or phase deviation, that is, the rising clock-pulse edges of the clock output signal are not uniformly spaced. As a result, the rising signal edge of the analog output signal delivered by analog-to-digital converter 39 acquires a break.

Figure 3C:
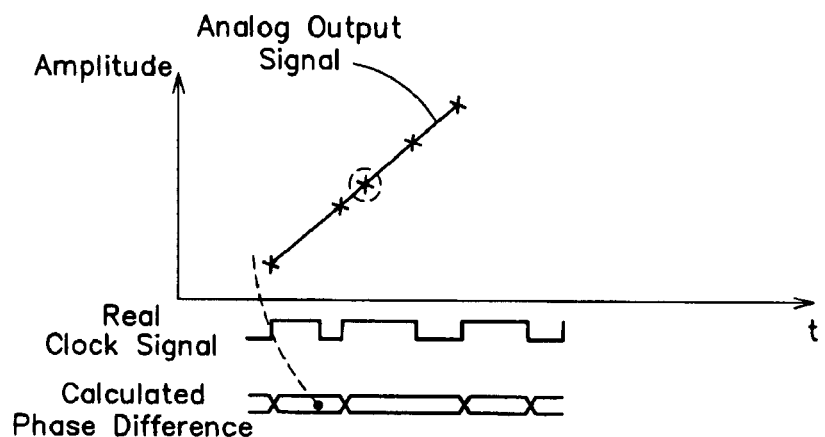

FIG. 3c shows that when the calculated phase deviation is output through digital data output 29 of digital clock generator 1 to data processing unit 35, this unit is enabled to calculate the output data stream as a function of the input data stream and phase deviation such that this stream has the non-equidistant time pattern of the real clock output signal. The linearity of the rising analog signal edge is created as a result of the corrected digital output values of data processing unit 35. Since the digital clock generator 1 according to the invention provides not only the real clock signal affected by phase deviation but also the associated phase deviation, data processing units 35 connected to digital clock generator 1 according to the invention are able to take the phase deviations into account during the processing of data.

The digital clock generator 1 according to the invention is especially suited for applications which require a very precise uniform clock signal, such as digital encoders, especially encoders for video processing such as CVBS encoders. Another possible area of application is the employment of digital clock generator 1 according to the invention as an oscillator within a digital phase-locked loop which contains, in addition to digital clock generator 1, a digital loop filter and a phase comparison circuit.

Another fundamental area of application for the digital clock generator according to the invention is digital decoders, especially decoders for video processing, such as MPEG decoder systems. The clock generator according to the invention used here may have a system clock frequency of 600 MHz. The phase deviation value of digital clock generator 1 is employed to correct the sampling values of an FBAS encoder.

The invention claimed is:

1. A digital clock generator, comprising:
   a system clock input to apply a high-frequency system clock signal;
   a digital data input to apply an adjustable digital incremental value;
   an adder to add said adjustable digital incremental value to feedback digital summed value of the adder, and provide a digital summed value indicative thereof;
   an output register to output the most-significant data bit of the digital summed value as the output clock signal of the clock generator through an output clock line; and
   a digital phase deviation calculation unit to calculate the phase deviation of the output clock signal as a function of the low-order data bits of the digital summed value and of the digital incremental value, wherein the phase deviation is output as a digital phase deviation value to a digital data output.

2. The digital clock generator of claim 1, wherein the digital phase deviation calculation unit has a scaling device connected to the digital data input to scale the phase deviation value as a function of the incremental value.

3. The digital clock generator of claim 2, wherein a scaled incremental value supplied by the scaling unit is temporarily stored in a scaling register of the digital phase deviation calculation unit.

4. The digital clock generator of claim 1, wherein the digital phase deviation calculation unit has a register to temporarily store the low-order data bits of the digital summed value generated by the adder.

5. The digital clock generator of claim 4, wherein the digital phase deviation calculation unit has a multi-bit multiplier which multiplies the temporarily stored scaled incremental value by the temporarily stored low-order data bit of the summed value to calculate the digital phase deviation value.

6. The digital clock generator of claim 1, comprising a register connected following the adder to temporarily store the summed value.

7. The digital clock generator of claim 6, wherein said register is clocked by the high-frequency system clock signal.

8. The digital clock generator of claim 7, wherein the high-frequency system clock signal has a frequency greater than 600 MHz.

9. The digital clock generator of claim 1, wherein the output clock line and the digital data output are connected to a data processing unit which converts an input data stream applied in an equidistant time pattern, said data stream corresponding to a sampled analog signal, to an output data stream which has the non-equidistant time pattern of the output clock signal applied to the output clock line.

10. The digital clock generator of claim 9, comprising a digital-to-analog converter to convert the output data stream to an analog output signal.

11. The digital clock generator of claim 10, wherein the digital-to-analog converter is clocked by the output clock signal.

* * * * *

UNITED STATES PATENT AND TRADEMARK OFFICE
CERTIFICATE OF CORRECTION

PATENT NO.         : 7,339,412 B2  Page 1 of 1
APPLICATION NO. : 10/276847
DATED              : March 4, 2008
INVENTOR(S)      : Hartmut Beintken It is certified that error appears in the above-identified patent and that said Letters Patent is hereby corrected as shown below:

Column 1
Line 9, insert --BACKGROUND OF THE INVENTION--
Line 47, delete "required" and insert --require--

Column 2
Line 39, delete "¹Translator's note: "the" interpolated."

Column 3
Line 39, delete "²Translator's note: inconsistent usage; elsewhere "adder""
Line 40, delete "³Translator's note: inconsistent usage; elsewhere "register.""

Column 5
Lines 35-36, delete "⁴Translator's note: inconsistent usage; elsewhere "output clock terminal" or "clock line output."

Signed and Sealed this

Twenty-ninth Day of July, 2008

JON W. DUDAS
*Director of the United States Patent and Trademark Office*